United States Patent
Meng et al.

(10) Patent No.: US 12,126,922 B2
(45) Date of Patent: Oct. 22, 2024

(54) VIRTUAL IMAGE DISPLAY SYSTEM, DATA PROCESSING METHOD THEREOF AND DISPLAY APPARATUS

(71) Applicant: BOE TECHNOLOGY GROUP CO., LTD., Beijing (CN)

(72) Inventors: Zhaohui Meng, Beijing (CN); Xue Dong, Beijing (CN); Wei Sun, Beijing (CN); Yongzhong Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/765,028

(22) PCT Filed: May 11, 2021

(86) PCT No.: PCT/CN2021/093170
§ 371 (c)(1),
(2) Date: Nov. 17, 2022

(87) PCT Pub. No.: WO2022/236715
PCT Pub. Date: Nov. 17, 2022

(65) Prior Publication Data
US 2024/0073558 A1    Feb. 29, 2024

(51) Int. Cl.
*H04N 25/70* (2023.01)
*G02F 1/133* (2006.01)
*G09G 3/20* (2006.01)
*H04N 25/60* (2023.01)
*H04N 25/76* (2023.01)

(52) U.S. Cl.
CPC ............ *H04N 25/70* (2023.01); *G02F 1/133* (2013.01); *G02F 1/13306* (2013.01); *G09G 3/20* (2013.01); *H04N 25/60* (2023.01); *H04N 25/76* (2023.01)

(58) Field of Classification Search
CPC ........ H04N 7/183; H04N 25/60; H04N 23/63; H04N 25/70; H04N 25/76; G02F 1/133; G02F 1/13306; G09G 3/20; G09G 3/3233
See application file for complete search history.

(56) References Cited

U.S. PATENT DOCUMENTS 8,797,019 B2    8/2014 Shan
10,690,910 B2 *    6/2020 Lamkin ................ G06F 3/1446
(Continued)

FOREIGN PATENT DOCUMENTS

CN    1453760 A    11/2003
CN    1632850 A    6/2005
(Continued)

*Primary Examiner* — Lin Ye
*Assistant Examiner* — Chriss S Yoder, III
(74) *Attorney, Agent, or Firm* — HOUTTEMAN LAW LLC

(57) ABSTRACT

An embodiment of the present disclosure provides a virtual image display system, including: a photoelectric conversion part for receiving an optical image signal and converting the optical image signal into a current signal; a voltage conversion part electrically connected to the photoelectric conversion part, for receiving the current signal and converting the current signal into a voltage signal; and a display part electrically connected to the voltage conversion part, for receiving the voltage signal and displaying an image according to the voltage signal.

20 Claims, 7 Drawing Sheets

(56) References Cited

U.S. PATENT DOCUMENTS

| | | | |
|---|---|---|---|
| 2008/0211786 A1* | 9/2008 | Park | G06F 3/042 345/175 |
| 2014/0192208 A1 | 7/2014 | Okincha | |
| 2021/0059028 A1 | 2/2021 | Greenwood | |

FOREIGN PATENT DOCUMENTS

| | | |
|---|---|---|
| CN | 101183185 A | 5/2008 |
| CN | 101350178 A | 1/2009 |
| CN | 101556785 A | 10/2009 |
| CN | 103915069 A | 7/2014 |
| CN | 104822032 A | 8/2015 |

* cited by examiner

VIRTUAL IMAGE DISPLAY SYSTEM, DATA PROCESSING METHOD THEREOF AND DISPLAY APPARATUS

TECHNICAL FIELD

The embodiment of the present disclosure belongs to the field of display technology, and in particular, relates to a virtual image display system, a data processing method thereof and a display apparatus.

BACKGROUND

At present, AR and VR display products are more and more popular.

AR, i.e., Augmented Reality technology, associates virtual things with reality, and thus, achieves a fusion of virtual images and real images. VR (Virtual Reality) technology completely virtualizes reality, such that people are fully immersed into the virtual world.

Each of the AR and VR display products collects videos or images of a real scene through a camera and a sensor, and transmits the collected videos or images to a processing unit in a background for analysis and reconstruction, realizing an interaction operation for a scene where the virtual things are combined with reality. Information fused by the system may be displayed in a display in real time and presented in a visual field of a person.

SUMMARY

The embodiments of the present disclosure provide a virtual image display system, a data processing method thereof and a display apparatus.

In a first aspect, an embodiment of the present disclosure provides a virtual image display system, including:
- a photoelectric conversion part configured to receive an optical image signal and convert the optical image signal into a current signal;
- a voltage conversion part electrically connected to the photoelectric conversion part, and configured to receive the current signal and convert the current signal into a voltage signal; and
- a display part electrically connected to the voltage conversion part, and configured to receive the voltage signal and display an image according to the voltage signal.

In some embodiments, the voltage conversion part includes at least one resistor circuit, a current signal input terminal of the resistor circuit is electrically connected to a current signal output terminal of each of the at least one photoelectric conversion part, and a voltage signal output terminal of the resistor circuit is electrically connected to a data signal input terminal of the display part.

In some embodiments, the current signal input terminal of the resistor circuit includes a first current input terminal and a second current input terminal;
the resistor circuit includes a first operational amplifier, a first resistor, a second resistor, a third resistor, a fourth resistor, a fifth resistor, a sixth resistor, a seventh resistor, an eighth resistor, a first variable resistor, a second variable resistor, a Voltage stabilizing diode and a capacitor;
a first input terminal of the first operational amplifier is connected to a first terminal of the second resistor, and a second terminal of the second resistor is connected to the first current input terminal, a first terminal of the fourth resistor and a first plate of the capacitor;
a second terminal of the fourth resistor is connected to an input terminal of the Voltage stabilizing diode, and an output terminal of the Voltage stabilizing diode is connected to a first terminal of the eighth resistor and a first terminal of the first variable resistor; a second terminal of the eighth resistor is connected to a voltage input terminal;
a second plate of the capacitor is connected to a first terminal of the third resistor, and a second terminal of the third resistor is connected to a second terminal of the first variable resistor;
a second input terminal of the first operational amplifier is connected to a first terminal of the first resistor, a first terminal of the fifth resistor and a first terminal of the sixth resistor; a second terminal of the first resistor is connected to the second current input terminal; a second terminal of the fifth resistor is connected to an adjusting terminal of the first variable resistor; and
an output terminal of the first operational amplifier is connected to a first terminal of the seventh resistor, and a second terminal of the seventh resistor is connected to the voltage signal output terminal and a first terminal of the second variable resistor; and a second terminal and an adjusting terminal of the second variable resistor are connected to a second terminal of the sixth resistor.

In some embodiments, the resistor circuit includes one resistor or a plurality of resistors, and
the plurality of resistors are connected in series;
or, the plurality of resistors are connected in parallel;
or, some of the plurality of resistors are connected in parallel and then connected in series with other resistors in the plurality of resistors.

In some embodiments, the display part includes a display substrate including a plurality of sub-pixels, a plurality of first scanning lines, and a plurality of first data lines; the plurality of sub-pixels are arranged in an array;
in the array of the sub-pixels, each row of the sub-pixels are connected to one of the plurality of first scanning lines, and each column of the sub-pixels are connected to one of the plurality of first data lines; and
the at least one resistor circuit comprises a plurality of resistor circuits, and the voltage signal output terminals of the plurality of resistor circuits are electrically connected to the plurality of first data lines in a one-to-one correspondence, respectively.

In some embodiments, the photoelectric conversion part includes a plurality of sub-parts, a plurality of second scanning lines, and a plurality of second data lines;
the plurality of sub-parts are arranged in an array, and are in a one-to-one correspondence with the plurality of sub-pixels, respectively;
in the array of the sub-parts, each row of the sub-parts are connected to one of the plurality of second scanning lines, and each column of the sub-parts are connected to one of the plurality of second data lines; and
the current signal input terminals of the plurality of resistor circuits are electrically connected to the plurality of second data lines in a one-to-one correspondence, respectively.

In some embodiments, each of the plurality of sub-parts includes a photoelectric sensor.

In some embodiments, the virtual image display system further includes a signal transmission gating part electrically connected to the plurality of second scanning lines, and configured to allow current signals output from the sub-parts corresponding to one of the plurality of second scanning lines to be transmitted to the plurality of resistor circuits through the plurality of second data lines, respectively, when a gating for the one of the plurality of second scanning lines is turned on, and to prevent the current signals output from the sub-parts from being transmitted to the plurality of resistor circuits when the gating is turned off.

In some embodiments, the signal transmission gating part includes a shift register circuit including a plurality of shift registers connected in cascade; and the plurality of shift registers are electrically connected to the plurality of second scanning lines in a one-to-one correspondence, respectively.

In some embodiments, the virtual image display system further includes a denoise part electrically connected to the photoelectric conversion part and the signal transmission gating part, respectively, and configured to perform a processing including amplification and automatic gain control on the current signal output from the photoelectric conversion part and transmit the processed current signal to the signal transmission gating part.

In some embodiments, the virtual image display system further includes a booster part electrically connected to the voltage conversion part and the display part, respectively, and configured to boost the voltage signal output from the voltage conversion part and provide the boosted voltage signal to the display part.

In some embodiments, the booster part includes at least one booster circuit;

each of the at least one booster circuit includes a second operational amplifier, a ninth resistor, a tenth resistor and an eleventh resistor;

a first input terminal of the second operational amplifier is connected to a first terminal of the ninth resistor, and a second terminal of the ninth resistor is connected to the voltage signal output terminal of the resistor circuit; and a second input terminal of the second operational amplifier is connected to a first terminal of the tenth resistor and a first terminal of the eleventh resistor, and a second terminal of the tenth resistor is grounded; and a second terminal of the eleventh resistor is connected to an output terminal of the second operational amplifier.

In some embodiments, the at least one booster circuit comprises a plurality of booster circuits, and the plurality of booster circuits are electrically connected to the voltage signal output terminals of the plurality of resistor circuits in a one-to-one correspondence, respectively.

In some embodiments, the virtual image display system further includes a buffer circuit electrically connected to the booster part and the display part, respectively, and configured to receive the voltage signal output from the booster part, buffer the voltage signal, and provide the buffered voltage signal to the display part.

In some embodiments, the virtual image display system further includes an optical processing device on a light outgoing side of the display substrate, and configured to optically process light emitted from the display substrate so that an image displayed by the display substrate is not distorted.

In some embodiments, the virtual image display system further includes an image signal acquisition part electrically connected to the photoelectric conversion part, and configured to acquire an optical image signal of an external object and provide the optical image signal to the photoelectric conversion part.

In some embodiments, the image signal acquisition part includes an image capturing unit; and the image capturing unit includes a camera or a charge coupled device.

In some embodiments, the image signal acquisition part further includes an infrared filtering unit, and the infrared filtering unit is on an image capturing side of the image capturing unit, and configured to filter out infrared light rays in light rays for capturing an image by the image capturing unit.

In a second aspect, an embodiment of the present disclosure further provides a display apparatus including the above described virtual image display system.

In a third aspect, an embodiment of the present disclosure further provides a data processing method for the virtual image display system, including:

receiving an optical image signal and converting the optical image signal into a current signal, by the photoelectric conversion part;

receiving the current signal and converting the current signal into a voltage signal, by the voltage conversion part; and receiving the voltage signal and displaying an image according to the voltage signal, by the display part.

In some embodiments, the data processing method includes:

grouping each row of sub-parts electrically connected to a same second scanning line, in an array of sub-parts, into one group of sub-parts;

simultaneously turning on the one group of sub-parts by the shift register circuit, so that current signals converted and output by the one group of sub-parts are simultaneously transmitted to the voltage conversion part through different second data lines; and simultaneously converting the current signals converted and output by the one group of sub-parts into voltage signals, and simultaneously transmitting the voltage signals to the sub-pixels in one row in an array of sub-pixels in a one-to-one correspondence, respectively, through different first data lines, by the voltage conversion part.

BRIEF DESCRIPTION OF DRAWINGS

The accompanying drawings, which are included to provide a further understanding of embodiments of the present disclosure and constitute a part of this specification, serve to explain the present disclosure together with the embodiments of the present disclosure, but do not constitute a limitation of the present disclosure. The above and other features and advantages will become more apparent to one of ordinary skill in the art by describing detailed example embodiments with reference to the accompanying drawings, in which.

DETAIL DESCRIPTION OF EMBODIMENTS

Figure 1:
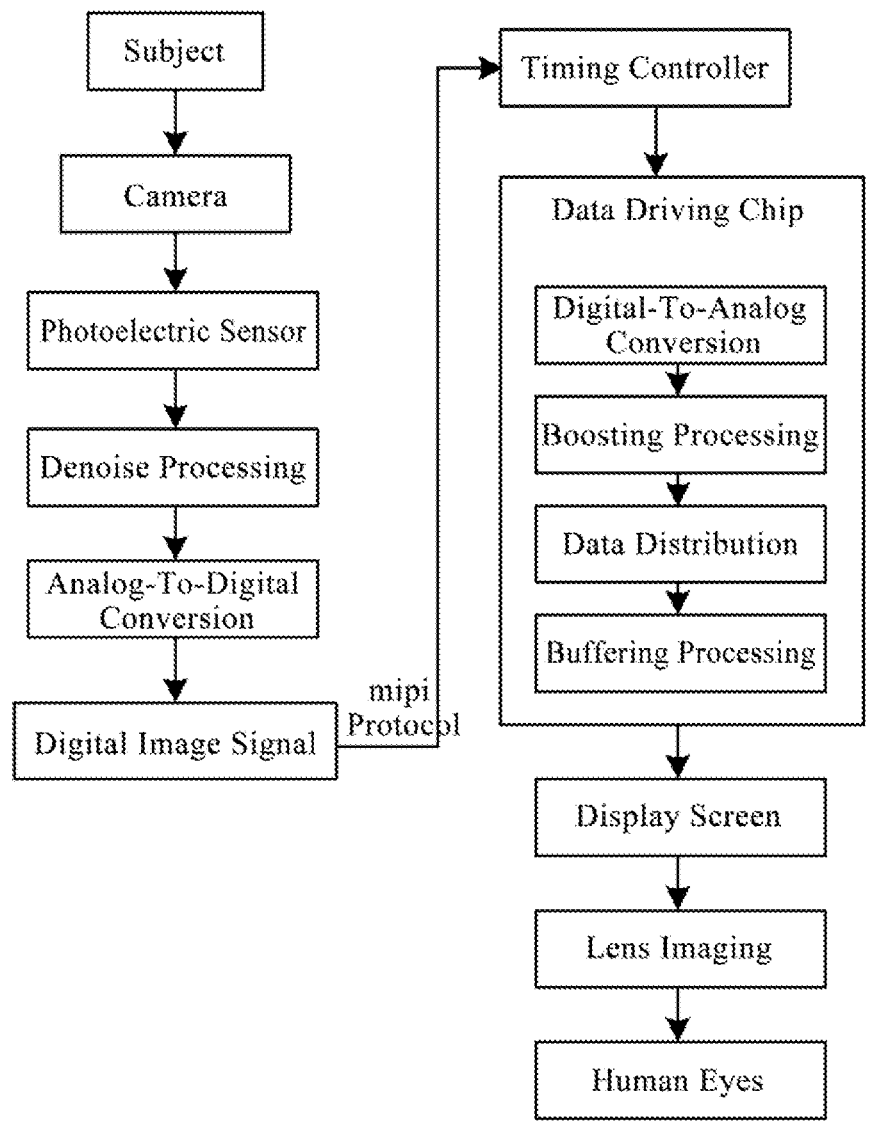
FIG. 1 is a schematic diagram illustrating a process of displaying image information in an AR/VR display product in the related art.

In order to enable one of ordinary skill in the art to better understand the technical solutions of the embodiments of the present disclosure, a virtual image display system, a data processing method thereof and a display apparatus provided in the embodiments of the present disclosure are described in further detail below with reference to the accompanying drawings and the detailed description.

The embodiments of the present disclosure will be described more fully hereinafter with reference to the accompanying drawings, and may be embodied in different forms and should not be construed as limited to the embodiments set forth herein. Rather, these embodiments are provided so that this disclosure will be thorough and complete, and will fully convey the scope of the present disclosure to one of ordinary skill in the art.

The embodiments of the present disclosure are not limited to the embodiments shown in the drawings, but include modifications of configurations formed based on a manufacturing process. Thus, regions illustrated in the drawings are schematic, and shapes of the regions shown in the drawings illustrate specific shapes of the regions, but are not intended to be limiting.

In the related art, referring to FIG. 1, a process of displaying image information in an AR/VR display product is as follows: in a first phase, an optical image is generated for a subject through a camera, and then, is projected on a surface of a photoelectric sensor; in a second phase, a signal of the optical image is converted into an analog electrical signal through the photoelectric sensor, and the analog electrical signal is converted into a digital image signal through denoise processing and analog-to-digital conversion (A/D conversion); in a third phase, the digital image signal with subject content is transmitted to a timing controller (Tcon) through a digital signal channel in a form of a mipi protocol to form a display scheme, the timing controller distributes the display content to a data driving chip (source driver), and the data driving chip transmits display scheme data to a display screen for display after performing digital-to-analog conversion (D/A conversion), boosting processing, data distribution and buffering processing on the display scheme data; and in a fourth phase, the display content on the display screen is formed as a virtual image through lenses, and the virtual image is captured by human eyes, so that the display process for the subject is completed.

In the above described process of displaying image information in the AR/VR display product, the analog electrical signal output from the photoelectric sensor is firstly converted into a digital image signal, the digital image signal is transmitted and processed, then the digital image signal is converted into an analog electrical signal, and finally the analog electrical signal is transmitted to the display screen for display. The display process has the problems of a complex conversion process for image signals, a complex processing flow for image signals, a long processing thread for image signals, a large amount of information processing, a large number of processing modules in the circuits and a large area of the circuits.

Aiming at the problems existing in the process of displaying image information in an AR/VR display product, an embodiment of the present disclosure provides the following technical scheme.

Figure 2:
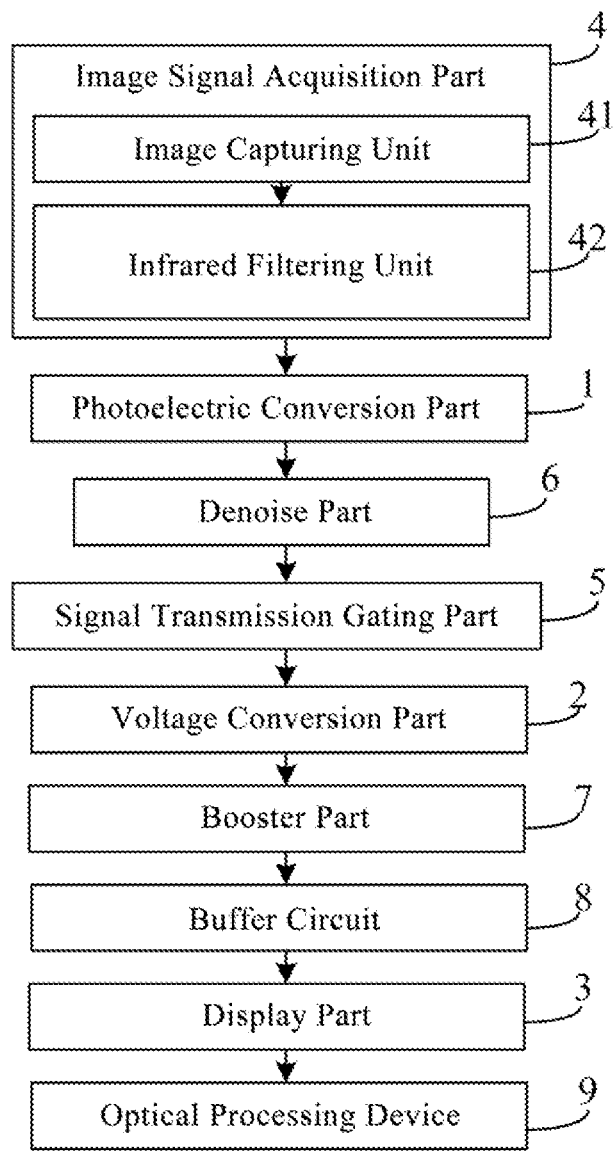
FIG. 2 is a block diagram illustrating a display principle of a virtual image display system according to an embodiment of the present disclosure.

In a first aspect, an embodiment of the present disclosure provides a virtual image display system, with reference to FIG. 2, including: a photoelectric conversion part 1 for receiving an optical image signal and converting the optical image signal into a current signal; a voltage conversion part 2 electrically connected to the photoelectric conversion part 1, for receiving the current signal and converting the current signal into a voltage signal; and a display part 3 electrically connected to the voltage conversion part 2, for receiving the voltage signal and displaying an image according to the voltage signal.

The virtual image display system may be an AR (i.e., Augmented Reality technology) display system, which associates virtual things with reality, and thus, achieves a fusion of virtual images and real images. Alternatively, the virtual image display system may be a VR display system, which completely virtualizes reality, such that people are fully immersed into the virtual world.

In some embodiments, the display part 3 receives the voltage signal converted and output by the voltage conversion part 2, and the voltage signal is used as a data signal for displaying by the display part 3, to drive the display part 3 to display, thereby realizing image display of the display part 3.

By providing the voltage conversion part 2, the current signal converted and output by the photoelectric conversion part 1 may be directly converted into the voltage signal, and the voltage signal is provided to the display part 3, such that the image is directly displayed by the display part 3. Compared with the related art, the analog-to-digital and digital-to-analog conversions for the displayed image signals are unnecessary, and the frequent and complex conversions for the displayed image signals are unnecessary, so that the processing flow for image signals is simplified, the processing thread for image signals is shortened, the amount of information processing is reduced, the number of the processing modules in the circuits are reduced, and the area of circuits is greatly reduced.

In some embodiments, the voltage conversion part 2 includes a resistor circuit, a current signal input terminal of the resistor circuit is electrically connected to a current signal output terminal of the photoelectric conversion part 1, and a voltage signal output terminal of the resistor circuit is electrically connected to a data signal input terminal of the display part 3.

Figure 3:
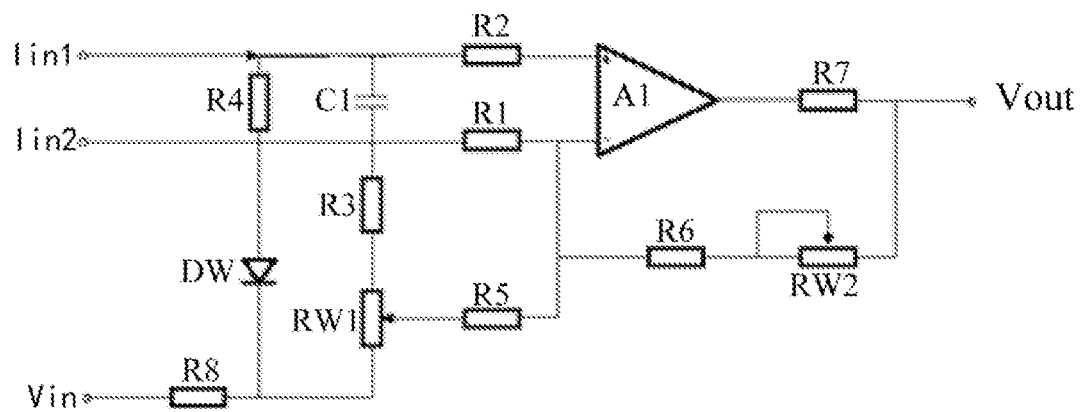
FIG. 3 is a circuit diagram of a resistor circuit according to an embodiment of the present disclosure.

In some embodiments, referring to FIG. 3, the current signal input terminal of the resistor circuit includes a first current input terminal Iin1 and a second current input terminal Iin2. The resistor circuit includes a first operational amplifier A1, a first resistor R1, a second resistor R2, a third resistor R3, a fourth resistor R4, a fifth resistor R5, a sixth resistor R6, a seventh resistor R7, an eighth resistor R8, a first variable resistor RW1, a second variable resistor RW2, a voltage stabilizing diode DW and a capacitor C1. A first input terminal of the first operational amplifier A1 is connected to a first terminal of the second resistor R2, a second terminal of the second resistor R2 is connected to the first current input terminal Iin1, a first terminal of the fourth resistor R4 and a first plate of the capacitor C1; a second terminal of the fourth resistor R4 is connected to an input terminal of the voltage stabilizing diode DW, and an output terminal of the voltage stabilizing diode DW is connected to a first terminal of the eighth resistor R8 and a first terminal of the first variable resistor RW1; a second terminal of the eighth resistor R8 is connected to a voltage input terminal Vin; a second plate of the capacitor C1 is connected to a first terminal of the third resistor R3, and a second terminal of the third resistor R3 is connected to a second terminal of the first variable resistor RW1; a second input terminal of the first operational amplifier A1 is connected to a first terminal of the first resistor R1, a first terminal of the fifth resistor R5 and a first terminal of the sixth resistor R6; a second terminal of the first resistor R1 is connected to the second current input terminal Iin2; a second terminal of the fifth resistor R5 is connected to an adjusting terminal of the first variable resistor RW1; an output terminal of the first operational amplifier A1 is connected to a first terminal of the seventh resistor R7, and a second terminal of the seventh resistor R7 is connected to the voltage signal output terminal Vout and a first terminal of the second variable resistor RW2; a second terminal and an adjustment terminal of the second variable resistor RW2 are connected to a second terminal of the sixth resistor R6.

The fifth resistor R5 is a feedback resistor, and the current flowing through the fifth resistor R5 is:

$$(Vout-VN)/(RW2+R6)=VN/R1+(Vin-VRW1)/R5;$$

the following relationship may be derived:

$$Vout=(1+R6/R1+R6/R5)\times VN-(R6/R5)\times VR6,$$

where VN is an input voltage at the first input terminal of the first operational amplifier A1; Vout is an output voltage at the voltage signal output terminal Vout of the resistor circuit; Vin is an input voltage at the voltage input terminal Vin; VR6 is an voltage across the sixth resistor R6.

According to the virtual short principle of the first operational amplifier A1, that is, when the operational amplifier is in a linear state, the two input terminals are regarded as having a same potential, that is, the voltages of the positive and the negative input terminals of the operational amplifier are equal to each other; VN=VP=Iin1×R4, where VP is an input voltage at the second input terminal of the first operational amplifier A1; Iin1 is a current input through the first current input terminal Iin1, which is converted and output by the photoelectric conversion part 1; a resistance value of the fourth resistor is set to be R4=200Ω, a resistance value of the first resistor is set to be R1=18 KΩ, a resistance value of the sixth resistor is set to be R6=7.14 KΩ, and a resistance value of the fifth resistor is set to be R5=43 KΩ, a voltage across the sixth resistor R6 is adjusted to be VR6=7.53V, the expression of the output voltage Vout at the voltage signal output terminal Vout of the resistor circuit may be written as follows: Vout=(1+7.14/18+7.14/43)×Iin1×0.2−(7.14/43)×7.53. Thus, it is obtained a circuit, in which the output voltage at the voltage signal output terminal Vout of the resistor circuit varies with the input current Iin1 at the current signal input terminal of the resistor circuit, that is, a circuit in which the output voltage at the resistor circuit varies with the current converted and output by the photoelectric conversion part 1.

Figure 4:
FIG. 4 is a circuit diagram of another resistor circuit according to an embodiment of the present disclosure.

In some embodiments, referring to FIG. 4, the resistor circuit may alternatively include one resistor, as long as a resistance value of the resistor is set such that the current signal is converted into a voltage signal with a set magnitude.

Figure 5:
FIG. 5 is a circuit diagram of another resistor circuit according to an embodiment of the present disclosure.

In some embodiments, referring to FIG. 5, the resistor circuit may alternatively include a plurality of resistors connected in series, as long as an overall resistance value of the plurality of resistors connected in series may be set such that the current signal is converted into a voltage signal with a set magnitude.

Figure 6:
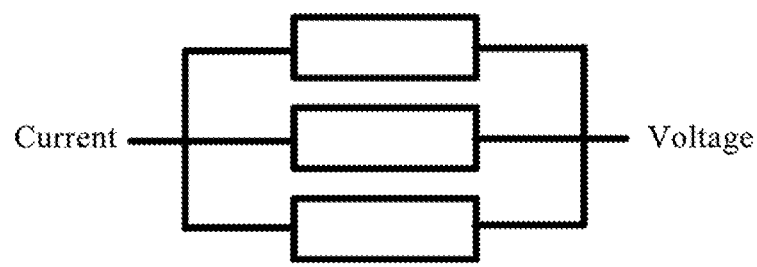
FIG. 6 is a circuit diagram of another resistor circuit according to an embodiment of the present disclosure.

In some embodiments, referring to FIG. 6, the resistor circuit may alternatively include a plurality of resistors connected in parallel, as long as an overall resistance value of the plurality of resistors connected in parallel is set such that the current signal is converted into a voltage signal with a set magnitude.

Figure 7:
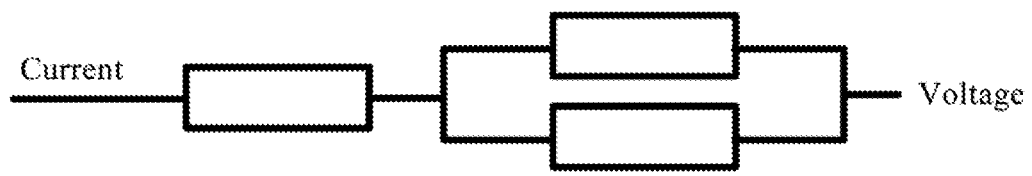
FIG. 7 is a circuit diagram of another resistor circuit according to an embodiment of the present disclosure.

In some embodiments, referring to FIG. 7, the resistor circuit may alternatively include a plurality of resistors, some of which are connected in parallel and then connected in series with other resistors, as long as an overall resistance value of the plurality of resistors may be set such that the current signal is converted into a voltage signal with a set magnitude.

Figure 8:
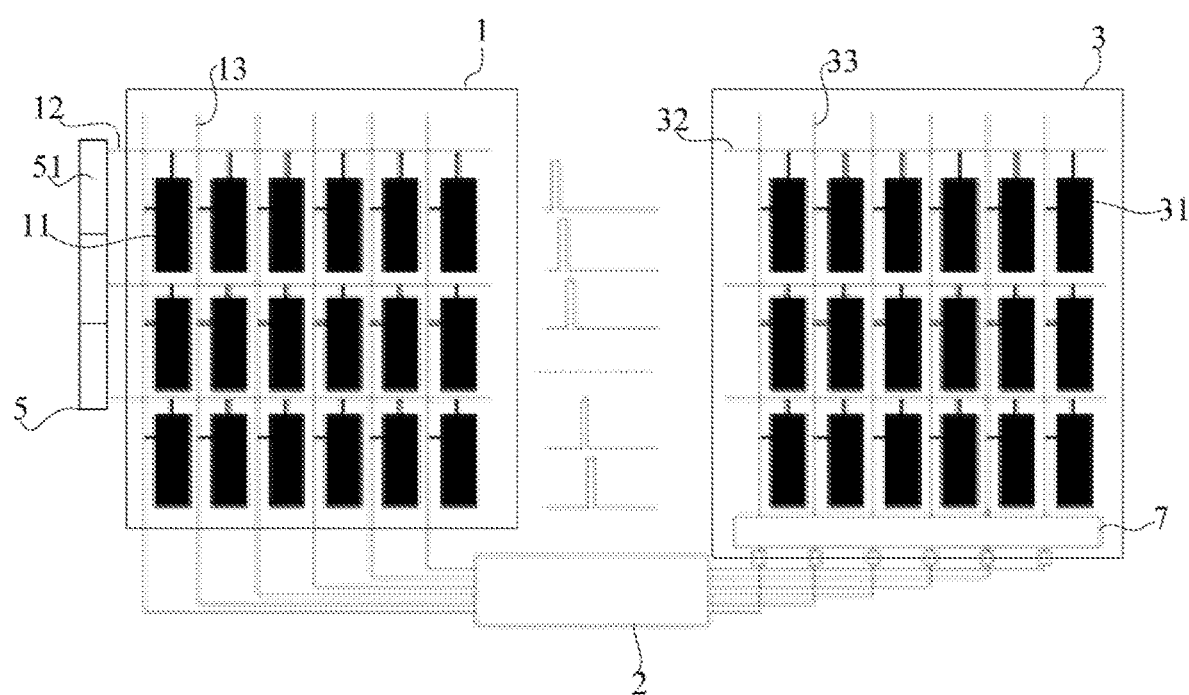
FIG. 8 is a schematic structural diagram illustrating a principle of providing a voltage signal by a photoelectric conversion part to a display part through a voltage conversion part, according to an embodiment of the present disclosure.

In some embodiments, referring to FIG. 8, the display part 3 includes a display substrate, the display substrate includes a plurality of sub-pixels 31, a plurality of first scanning lines 32, and a plurality of first data lines 33. The plurality of sub-pixels 31 are arranged in an array. In the array of the sub-pixels 31, each row of the sub-pixels 31 are connected to one first scanning line 32, and each column of the sub-pixels 31 are connected to one first data line 33. The voltage conversion part 2 includes a plurality of resistor circuits, and the voltage signal output terminals of the plurality of resistor circuits are electrically connected to the plurality of first data lines 33 in a one-to-one correspondence, respectively.

In some embodiments, the photoelectric conversion part 1 includes a plurality of sub-parts 11, a plurality of second scanning lines 12, and a plurality of second data lines 13. The plurality of sub-parts 11 are arranged in an array. The plurality of sub-parts 11 are in a one-to-one correspondence with the plurality of sub-pixels 31, respectively. In the array of the sub-parts 11, each row of the sub-parts 11 are connected to one second scanning line 12, and each column of the sub-parts 11 are connected to one second data line 13. The current signal input terminals of the plurality of resistor circuits are electrically connected to the plurality of second data lines 13 in a one-to-one correspondence, respectively.

One sub-part 11 converts the optical image signal of a corresponding sub-pixel 31 into a current signal, and transmits the current signal of the sub-pixel 31 to a corresponding resistor circuit through the second data line 13. The resistor circuit receives the current signal and converts the current signal into a voltage signal, and then provides the voltage signal to the corresponding sub-pixel 31 through the first data line 33, thereby realizing an image display of the sub-pixel 31.

In some embodiments, the sub-part 11 includes a photoelectric sensor. The photoelectric sensor may convert the optical image signal into a current signal and output the current signal.

In some embodiments, referring to FIG. 2, the virtual image display system further includes an image signal acquisition part 4 electrically connected to the photoelectric conversion part 1, for acquiring an optical image signal of an external object and providing the optical image signal to the photoelectric conversion part 1.

The image signal acquisition part 4 includes an image capturing unit 41; the image capturing unit 41 includes a camera or a charge coupled device (i.e., CCD). The image capturing unit 41 may project a photographed optical image of a subject onto a photosensitive surface of the photoelectric sensor, so that the optical image of the subject is formed as an image current signal in a frame mode, in which the current signal converted and output by each photoelectric sensor is correspondingly provided to each sub-pixel 31 in the display substrate, thereby realizing display of one frame of image by the display substrate, and one frame of image displayed by the display substrate corresponds to one frame of optical image of the subject photographed by the image capturing unit 41.

In some embodiments, the image signal acquisition part 4 further includes an infrared filtering unit 42, and the infrared filtering unit 42 is disposed on an image capturing side of the image capturing unit 41 and is used for filtering out infrared light rays in light rays for capturing an image by the image capturing unit 41. The infrared filtering unit 42 is used to prevent infrared rays and ultraviolet rays and the like from entering the image capturing unit 41, so that the image capturing unit 41 may only sense visible light, and thus the image photographed by the image capturing unit 41 is the same as the image seen by the naked eye.

In some embodiments, the infrared filtering unit 42 may include an infrared filter.

In some embodiments, referring to FIGS. 2 and 8, the virtual image display system further includes a signal transmission gating part 5 electrically connected to the second scanning lines 12, for allowing the current signals output from the sub-parts 11 corresponding to one of the plurality of second scanning lines to be transmitted to the resistor circuits through the second data lines 13 when a gating for the one of the plurality of second scanning lines is turned on, and for preventing the current signals output from the sub-parts 11 from being transmitted to the resistor circuits when the gating is turned off.

Figure 9:
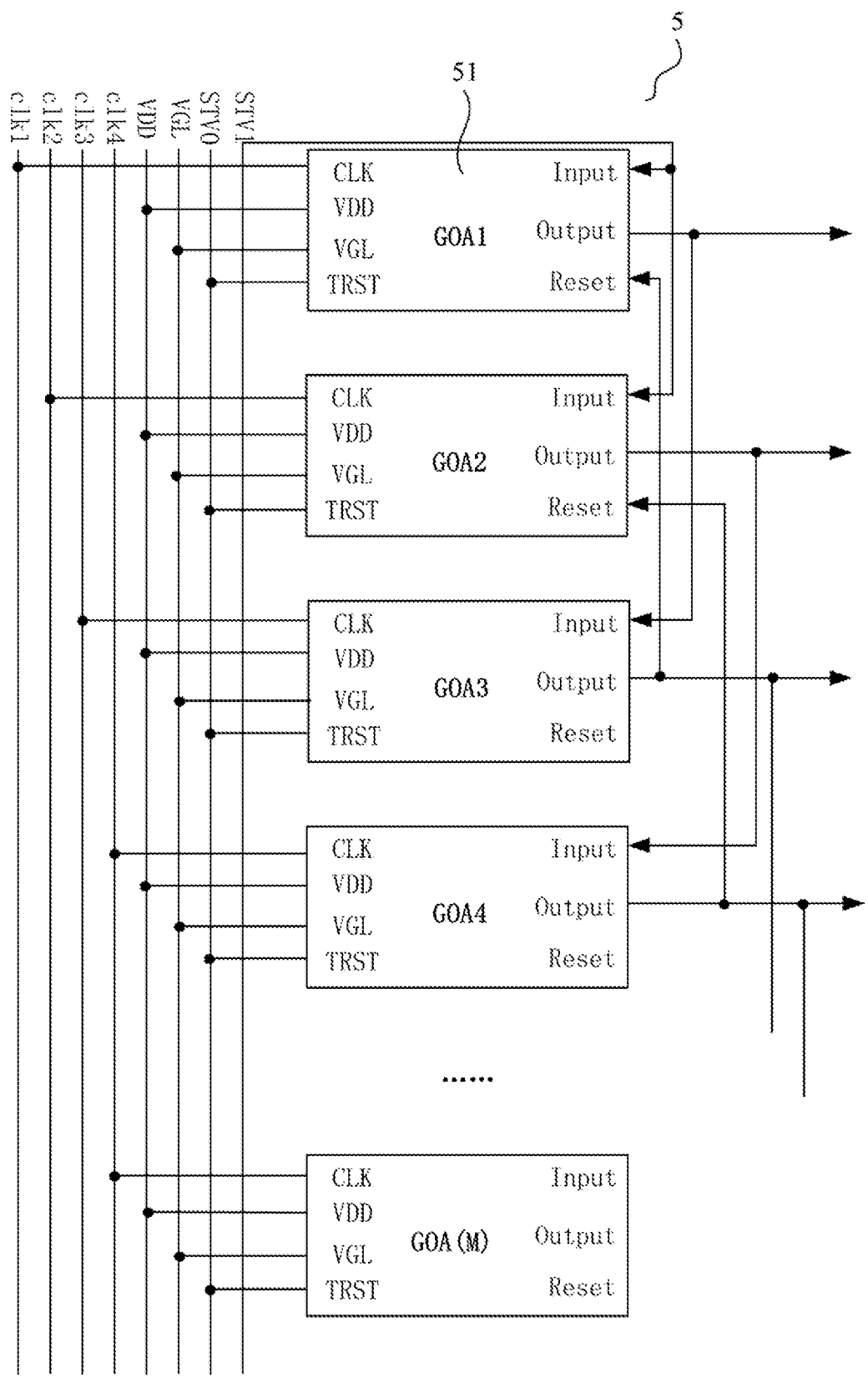
FIG. 9 is a schematic diagram illustrating a cascade of shift registers in a shift register circuit.
Figure 10:
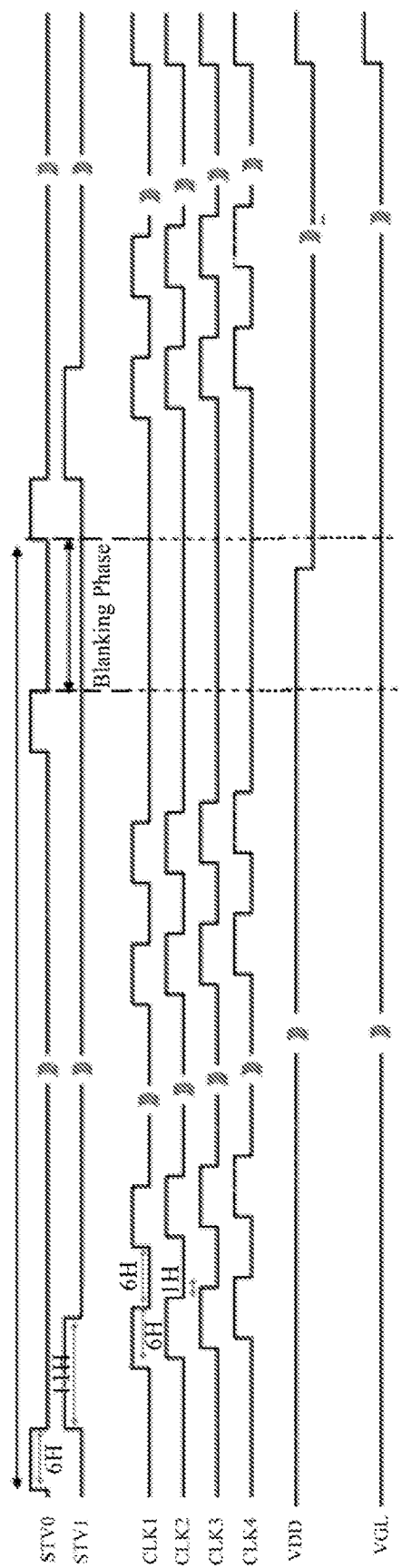
FIG. 10 is a timing diagram of an operation of a shift register circuit.

In some embodiments, referring to FIGS. 9 and 10, the signal transmission gating part 5 includes a shift register circuit, including a plurality of shift registers 51 connected in cascade; the plurality of shift registers 51 are electrically connected to the plurality of second scanning lines in a one-to-one correspondence, respectively. Since one second scanning line is connected to one row of sub-parts, the signal transmission gating part 5 turns on each row of sub-parts in sequence by taking each row of sub-parts as one group, so that the current signals output from each row of sub-parts are grouped into one group, one group of current signals are simultaneously transmitted to the corresponding resistor circuits in the voltage conversion part 2 for voltage conversion. That is, the plurality of resistor circuits correspondingly receiving one group of current signals form one group, the voltage conversion part 2 simultaneously provides the voltage signals converted and output by one group of resistor circuits to one row of sub-pixels in the display substrate, so that the array of sub-pixels in the display substrate perform row-by-row data refreshing, and finally, the display of one frame of image is realized.

Referring to FIG. 9, the shift register circuit adopts 4 clock signal lines, wherein a first input signal terminal is an input signal terminal Input, and a second signal input terminal is a reset signal terminal Reset. The 4 clock signal lines are clk1, clk2, clk3 and clk4, respectively. If the shift register circuit includes M shift registers, a signal output terminal Output of an $N^{th}$-stage shift register is connected to an input signal terminal Input of an $(N+2)^{th}$-stage shift register; a reset signal terminal Reset of the $N^{th}$-stage shift register is connected to a signal output terminal Output of the $(N+2)^{th}$-stage shift register; wherein N is an integer selected from 1 to M. In addition, the signal input terminals of the first-stage shift register and the second-stage shift register are connected to a frame starting signal line STV1; a reset signal terminal Trst of each of the shift registers is connected to a same frame reset signal line STV0.

It should be noted that the shift register of the first stage and the shift register of the last stage are interchangeable, and are determined according to the forward scanning and the reverse scanning of the shift register circuit. When the shift register circuit is used for forwardly scanning the second scanning lines, according to the scanning sequence for the second scanning lines, a shift register for providing the scanning signal to a first second scanning line is a first-stage shift register; and a shift register for providing the scanning signal to the last second scanning line is a last-stage shift register. When the shift register circuit is used for reversely scanning the second scanning lines, according to the scanning sequence for the second scanning lines, the last second scanning line is firstly input with a scanning signal, so that the shift register for providing the scanning signal for the last second scanning line is the first-stage shift register; and the shift register for providing the scanning signal to the first second scanning line is the last-stage shift register. Meanwhile, forward scanning and reverse scanning may be exchanged by only exchanging input signals at the first power supply voltage terminal VDD and the second power supply voltage terminal, and exchanging signals input to the signal input terminal and the reset signal terminal Reset.

In some embodiments, it is not necessary to provide the shift register circuit in the display part 3, or, an additional shift register circuit may be additionally provided to perform scanning driving during the display.

In some embodiments, referring to FIG. 2, the virtual image display system further includes a denoise part 6 electrically connected to the photoelectric conversion part 1 and the signal transmission gating part 5, respectively, for performing a processing including amplification and automatic gain control (AGC) processing on the current signal output from the photoelectric conversion part 1, and transmitting the processed current signal to the signal transmission gating part 5. The effect of amplifying the current signal is that the current signal is amplified by a low noise amplifier at the fore-end to improve the carrier-to-noise ratio, when the received signal is too weak to meet the carrier-to-noise ratio requirement of the system. The effect of the automatic gain control processing is that in order to keep the level of the output signal stable, the automatic gain control must be performed in a main line amplifier, to compensate for the effects of temperature variations.

In some embodiments, the denoise part 6 may alternatively perform other processing on the current signal, such as frequency conversion, modulation, demodulation, adjacent channel/frequency processing, and the like. The denoise part 6 employs a conventional denoise circuit, which is not described in detail herein.

In some embodiments, referring to FIG. 2, the virtual image display system further includes a booster part 7 electrically connected to the voltage conversion part 2 and the display part 3, respectively, for boosting the voltage signal output from the voltage conversion part 2 and providing the boosted voltage signal to the display part 3. Since the voltage signal converted and output by the voltage conversion part 2 is relatively weak, the booster part 7 is required to boost the voltage signal to ensure that the display part 3 can normally display the image under the driving of the boosted voltage signal.

Figure 11:
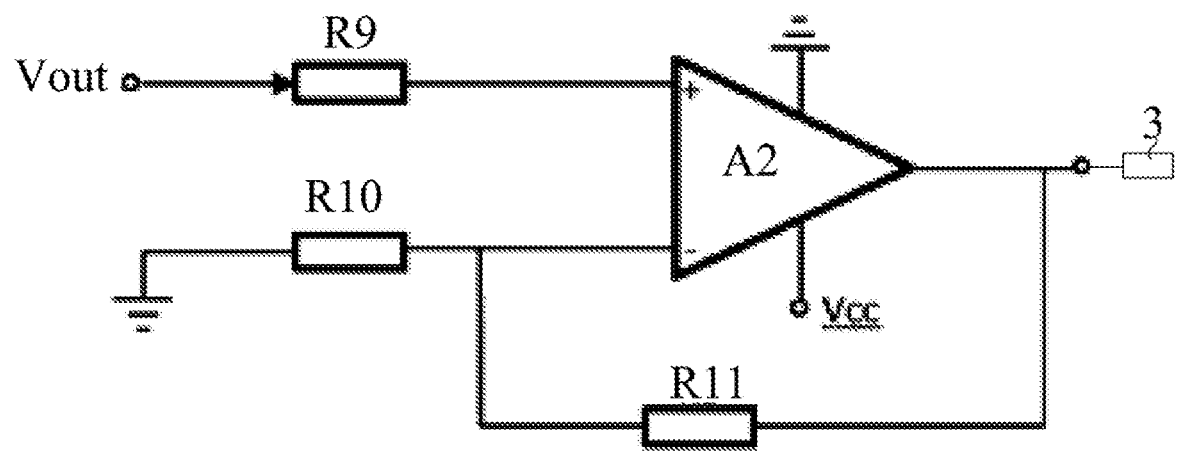
FIG. 11 is a circuit diagram of a booster circuit according to an embodiment of the present disclosure.

In some embodiments, referring to FIG. 11, the booster part 7 includes a booster circuit. The booster circuit includes a second operational amplifier A2, a ninth resistor R9, a tenth resistor R10 and an eleventh resistor R11. A first input terminal of the second operational amplifier A2 is connected to a first terminal of the ninth resistor R9, and a second terminal of the ninth resistor R9 is connected to the voltage signal output terminal Vout of the resistor circuit; a second input terminal of the second operational amplifier A2 is connected to a first terminal of the tenth resistor R10 and a first terminal of the eleventh resistor R11, and a second terminal of the tenth resistor R10 is grounded; a second terminal of the eleventh resistor R11 is connected to an output terminal of the second operational amplifier A2. The voltage signal output through the output terminal of the second operational amplifier A2 is supplied to the display part 3.

The voltages at the first input terminal and the second input terminal of the second operational amplifier A2 (i.e., the positive and negative input terminals of the second operational amplifier A2) are equal to each other, no current enters the positive and negative input terminals of the second operational amplifier A2, which is equivalent to an open circuit. At this time, the positive and negative input terminals of the second operational amplifier A2 are virtually disconnected. That is, when the operational amplifier is in a linear state, the two input terminals are regarded as an open circuit, that is, the currents flowing into the positive and negative input terminals are zero. The current through the first input terminal of the second operational amplifier A2 is equivalent to an input voltage Ui(Ui=Vout), and the current through the tenth resistor R10 is equal to the current I through the eleventh resistor R11, which results in the following equation:

$$I=(Uo-Ui)/R11=Ui/R10;$$

where Uo is a voltage signal output through the output terminal of the second operational amplifier A2, that is, Uo is a voltage signal finally provided to the display part 3 by the booster part 7. Uo=Ui(1+R11/R10), i.e., Uo has a (1+R11/R10) proportional operation to Ui. The ninth resistor R9 generally has a same value as that obtained by connecting the tenth resistor R10 and the eleventh resistor R11 in parallel, and the resistance values of the ninth resistor R9, the tenth resistor R10 and the eleventh resistor R11 need to be designed according to different product requirements.

It should be noted that the booster circuit is not limited to the circuit in FIG. 11, and other circuits capable of realizing a voltage boost may be applied in the embodiment of the present disclosure.

In some embodiments, the booster part 7 includes a plurality of booster circuits, which are electrically connected to the voltage signal output terminals of the plurality of resistor circuits in a one-to-one correspondence, respectively. Since a resistor circuit is correspondingly connected to a second data line, which is, in turn, correspondingly connected to a sub-part in a row of sub-parts, the number of the resistor circuits is equal to that of the sub-parts in one row of the sub-parts, the number of booster circuits is equal to the number of resistor circuits, the voltage signals converted and output by the resistor circuits electrically connected to the booster circuits are boosted by the booster circuits, respectively, and then the boosted voltage signals are each provided for each sub-pixel in one row of sub-pixels in the array of the sub-pixels in the display substrate, so as to drive sub-pixels to display a corresponding image.

In some embodiments, referring to FIG. 2, the virtual image display system further includes a buffer circuit 8 electrically connected to the booster part 7 and the display part 3, respectively, for receiving the voltage signal output from the booster part 7 and buffering the voltage signal and providing the buffered voltage signal to the display part 3.

Figure 12:
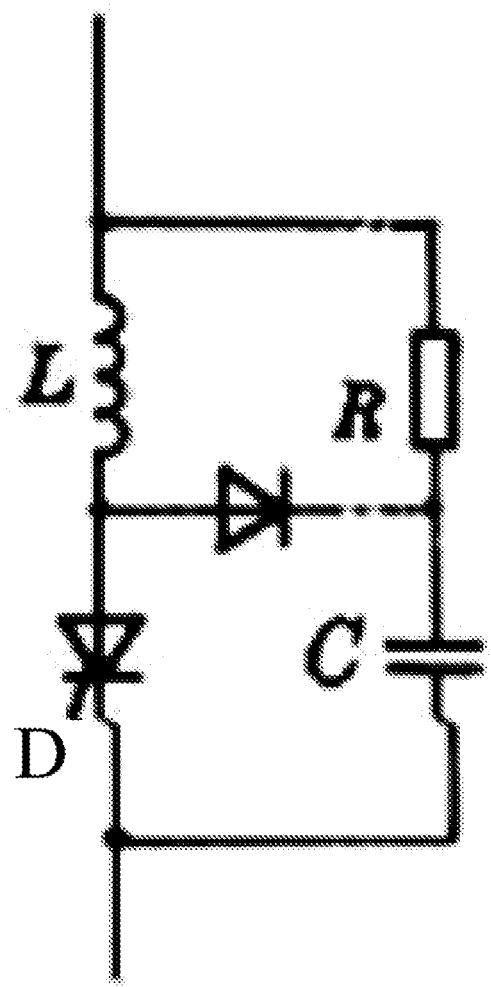
FIG. 12 is a circuit diagram of a buffer circuit according to an embodiment of the present disclosure.

FIG. 12 shows an example of the buffer circuit 8. The basic operation principle of the buffer circuit 8 is to suppress the current rise rate of the device by means of the characteristic that an inductor current cannot abruptly change, and to suppress the voltage rise rate of the device by means of the characteristic that a capacitor voltage cannot abruptly change. FIG. 12 shows a simple buffer circuit, which includes a GTO (gate turn-off thyristor) as an example. An inductor L and a thyristor GTO are connected in series to suppress the current rise rate dI/dt when GTO is conducted, a capacitor C and a diode D form a turn-off absorption circuit to suppress the voltage rise rate dV/dt at the terminal when the GTO is turned off, and a resistor R provides a discharging path for the capacitor C. The buffer circuit 8 has various forms to be adapted to different devices and different circuits.

In some embodiments, referring to FIG. 2, the virtual image display system further includes an optical processing device 9. The optical processing device 9 is disposed on a light outgoing side of the display substrate, and is used for optically processing the light emitted from the display substrate, so that an image displayed by the display substrate is not distorted.

The AR/VR display is a fusion of virtual and real images. The AR technology has three characteristics of virtual & reality fusion, real-time interaction and three-dimensional registration. The three-dimensional registration is the most important characteristic for the AR technology. The three-dimensional registration (also called 3D registration) emphasizes the correspondence between computer-generated objects and the reality environment, and the three-dimensional positions and sizes of virtual objects and the reality environment must be perfectly fused. In order to realize a perfect fusion of the virtual image and the real image for the AR/VR, some processing, such as distortion processing, is usually performed on the display image of the display substrate, so that human eyes may be in an atmosphere of the fusion of the virtual image and the real image when watching the AR/VR display image, thereby improving the watching experience. However, if the AR/VR display image is directly viewed by the human eyes, the image cannot be normally presented in the human eyes due to distortion. By providing the optical processing device 9, the light emitted from the display substrate may be optically processed, so that the image displayed by the display substrate is not distorted, and the human eyes may view the normal AR/VR display image.

In some embodiments, the optical processing device 9 may be directly formed on the light outgoing surface of the display substrate, or may be independently disposed on the light outgoing side of the display substrate. In some embodiments, the optical processing device 9 may be a convex lens, a fresnel lens, or some other optical device such as a lens or a combination of lenses. In short, the optical processing device 9 may perform anti-distortion processing on the distorted image, so that the human eyes can directly view a normal AR/VR display image.

Based on the above structure and principle of the virtual image display system, an embodiment of the present disclosure further provides a data processing method for the virtual image display system, including:

> receiving an optical image signal and converting the optical image signal into a current signal, by the photoelectric conversion part;
>
> receiving the current signal and converting the current signal into a voltage signal, by the voltage conversion part; and
>
> receiving the voltage signal and displaying an image according to the voltage signal, by the display part.

In some embodiments, the data processing method specifically includes: grouping each row of sub-parts electrically connected to a same second scanning line, in an array of sub-parts, into one group of sub-parts; simultaneously turning on one group of the sub-parts by the shift register circuit, so that current signals converted and output by the one group of the sub-parts are simultaneously transmitted to the voltage conversion part through different second data lines; and simultaneously converting the current signals converted and output by the one group of sub-parts into voltage signals, and simultaneously transmitting the voltage signals to the sub-pixels in one row in an array of sub-pixels in a one-to-one correspondence, respectively, through different first data lines, by the voltage conversion part.

According to the virtual image display system and the data processing method thereof provided by the embodiment of the present disclosure, by arranging the voltage conversion part, the current signal converted and output by the photoelectric conversion part may be directly converted into the voltage signal, and the voltage signal is provided to the display part, the direct display of the image by the display part is realized. Compared with the related art, the analog-to-digital and digital-to-analog conversions for the displayed image signals are unnecessary, the frequent and complex conversions for the displayed image signals are unnecessary, so that the processing flow for image signals is simplified, the processing thread for image signals is shortened, the amount of information processing is reduced, the number of circuit processing modules are reduced, and the area of circuit is greatly reduced.

An embodiment of the present disclosure further provides a display apparatus, which includes the virtual image display system in the above described embodiment.

By adopting the virtual image display system in the above described embodiment, while the display apparatus realizes virtual image display, the analog-to-digital and digital-to-analog conversions for the displayed image signals are unnecessary, the frequent and complex conversions for the displayed image signals are unnecessary, so that the processing flow for image signals is simplified, the processing thread for image signals is shortened, the amount of information processing is reduced, the number of circuit processing modules are reduced, and the area of circuits is greatly reduced, and the manufacturing cost and the display cost of the display apparatus for virtual image display is reduced.

The display apparatus provided by the embodiment of the present disclosure may be any product or component with a display function, such as an LCD panel, an LCD television, a monitor, a mobile phone, a navigator and the like.

It will be understood that the above embodiments are merely exemplary embodiments adopted to illustrate the principles of the present disclosure, and the present disclosure is not limited thereto. It will be apparent to one of ordinary skill in the art that various changes and modifications can be made without departing from the spirit and scope of the present disclosure, and these changes and modifications are to be considered within the scope of the present disclosure.

What is claimed is:

1. A virtual image display system, comprising:
   a photoelectric conversion part configured to receive an optical image signal and convert the optical image signal into a current signal;
   a voltage conversion part electrically connected to the photoelectric conversion part, and configured to receive the current signal and convert the current signal into a voltage signal; and
   a display part electrically connected to the voltage conversion part, and configured to receive the voltage signal and display an image according to the voltage signal.

2. The virtual image display system according to claim 1, wherein
   the voltage conversion part comprises at least one resistor circuit, a current signal input terminal of each of the at least one resistor circuit is electrically connected to a current signal output terminal of the photoelectric conversion part, and a voltage signal output terminal of the resistor circuit is electrically connected to a data signal input terminal of the display part.

3. The virtual image display system according to claim 2, wherein
   the current signal input terminal of the resistor circuit comprises a first current input terminal and a second current input terminal;
   the resistor circuit comprises a first operational amplifier, a first resistor, a second resistor, a third resistor, a fourth resistor, a fifth resistor, a sixth resistor, a seventh resistor, an eighth resistor, a first variable resistor, a second variable resistor, a voltage stabilizing diode and a capacitor;
   a first input terminal of the first operational amplifier is connected to a first terminal of the second resistor, and a second terminal of the second resistor is connected to the first current input terminal, a first terminal of the fourth resistor and a first plate of the capacitor;
   a second terminal of the fourth resistor is connected to an input terminal of the voltage stabilizing diode, and an output terminal of the voltage stabilizing diode is connected to a first terminal of the eighth resistor and a first terminal of the first variable resistor; a second terminal of the eighth resistor is connected to a voltage input terminal;
   a second plate of the capacitor is connected to a first terminal of the third resistor, and a second terminal of the third resistor is connected to a second terminal of the first variable resistor;
   a second input terminal of the first operational amplifier is connected to a first terminal of the first resistor, a first terminal of the fifth resistor and a first terminal of the sixth resistor; a second terminal of the first resistor is connected to the second current input terminal; a second terminal of the fifth resistor is connected to an adjusting terminal of the first variable resistor; and
   an output terminal of the first operational amplifier is connected to a first terminal of the seventh resistor, and a second terminal of the seventh resistor is connected to the voltage signal output terminal and a first terminal of the second variable resistor; and a second terminal and an adjusting terminal of the second variable resistor are connected to a second terminal of the sixth resistor.

4. The virtual image display system according to claim 2, wherein
the resistor circuit comprises one resistor or a plurality of resistors, and
the plurality of resistors are connected in series;
or, the plurality of resistors are connected in parallel;
or, some of the plurality of resistors are connected in parallel and then connected in series with other resistors in the plurality of resistors.

5. The virtual image display system according to claim 2, wherein
the display part comprises a display substrate comprising a plurality of sub-pixels, a plurality of first scanning lines, and a plurality of first data lines; the plurality of sub-pixels are arranged in an array;
in the array of the sub-pixels, each row of the sub-pixels are connected to one of the plurality of first scanning lines, and each column of the sub-pixels are connected to one of the plurality of first data lines; and
the at least one resistor circuit comprises a plurality of resistor circuits, and the voltage signal output terminals of the plurality of resistor circuits are electrically connected to the plurality of first data lines in a one-to-one correspondence, respectively.

6. The virtual image display system according to claim 5, wherein
the photoelectric conversion part comprises a plurality of sub-parts, a plurality of second scanning lines, and a plurality of second data lines;
the plurality of sub-parts are arranged in an array, and are in a one-to-one correspondence with the plurality of sub-pixels, respectively;
in the array of the sub-parts, each row of the sub-parts are connected to one of the plurality of second scanning lines, and each column of the sub-parts are connected to one of the plurality of second data lines; and
the current signal input terminals of the plurality of resistor circuits are electrically connected to the plurality of second data lines in a one-to-one correspondence, respectively.

7. The virtual image display system according to claim 6, wherein each of the plurality of sub-parts comprises a photoelectric sensor.

8. The virtual image display system according to claim 7, further comprising a signal transmission gating part electrically connected to the plurality of second scanning lines, and configured to allow current signals output from the sub-parts corresponding to one of the plurality of second scanning lines to be transmitted to the plurality of resistor circuits through the plurality of second data lines, respectively, when a gating for the one of the plurality of second scanning lines is turned on, and to prevent the current signals output from the sub-parts from being transmitted to the plurality of resistor circuits when the gating is turned off.

9. The virtual image display system according to claim 8, wherein
the signal transmission gating part comprises a shift register circuit comprising a plurality of shift registers connected in cascade; and
the plurality of shift registers are electrically connected to the plurality of second scanning lines in a one-to-one correspondence, respectively.

10. The virtual image display system according to claim 8, further comprising a denoise part electrically connected to the photoelectric conversion part and the signal transmission gating part, respectively, and configured to perform a processing comprising amplification and automatic gain control on the current signal output from the photoelectric conversion part and transmit the processed current signal to the signal transmission gating part.

11. The virtual image display system according to claim 8, further comprising a booster part electrically connected to the voltage conversion part and the display part, respectively, and configured to boost the voltage signal output from the voltage conversion part and provide the boosted voltage signal to the display part.

12. The virtual image display system according to claim 11, wherein
the booster part comprises at least one booster circuit;
each of the at least one booster circuit comprises a second operational amplifier, a ninth resistor, a tenth resistor and an eleventh resistor;
a first input terminal of the second operational amplifier is connected to a first terminal of the ninth resistor, and a second terminal of the ninth resistor is connected to the voltage signal output terminal of the resistor circuit; and
a second input terminal of the second operational amplifier is connected to a first terminal of the tenth resistor and a first terminal of the eleventh resistor, and a second terminal of the tenth resistor is grounded; and a second terminal of the eleventh resistor is connected to an output terminal of the second operational amplifier.

13. The virtual image display system according to claim 12, wherein
the at least one booster circuit comprises a plurality of booster circuits, and
the plurality of booster circuits are electrically connected to the voltage signal output terminals of the plurality of resistor circuits in a one-to-one correspondence, respectively.

14. The virtual image display system according to claim 11, further comprising a buffer circuit electrically connected to the booster part and the display part, respectively, and configured to receive the voltage signal output from the booster part, buffer the voltage signal, and provide the buffered voltage signal to the display part.

15. The virtual image display system according to claim 7, further comprising an image signal acquisition part electrically connected to the photoelectric conversion part, and configured to acquire an optical image signal of an external object and provide the optical image signal to the photoelectric conversion part.

16. The virtual image display system according to claim 15, wherein the image signal acquisition part comprises an image capturing unit; and
the image capturing unit comprises a camera or a charge coupled device.

17. The virtual image display system according to claim 16, wherein
the image signal acquisition part further comprises an infrared filtering unit, and
the infrared filtering unit is on an image capturing side of the image capturing unit, and configured to filter out infrared light rays in light rays for capturing an image by the image capturing unit.

18. The virtual image display system according to claim 5, further comprising an optical processing device on a light outgoing side of the display substrate, and configured to optically process light emitted from the display substrate so that an image displayed by the display substrate is not distorted.

19. A display apparatus, comprising the virtual image display system according to claim 1.

20. A data processing method for the virtual image display system according to claim 1, comprising:
- receiving an optical image signal and converting the optical image signal into a current signal, by the photoelectric conversion part;
- receiving the current signal and converting the current signal into a voltage signal, by the voltage conversion part; and
- receiving the voltage signal and displaying an image according to the voltage signal, by the display part.

* * * * *